(12) United States Patent
Bottome

(10) Patent No.: US 8,702,382 B2
(45) Date of Patent: Apr. 22, 2014

(54) COMPOSITE COMPONENT

(75) Inventor: Kristofer John Bottome, Nottingham (GB)

(73) Assignee: Rolls-Royce PLC (GB)

( * ) Notice: Subject to any disclaimer, the term of this patent is extended or adjusted under 35 U.S.C. 154(b) by 1183 days.

(21) Appl. No.: 12/614,887

(22) Filed: Nov. 9, 2009

(65) Prior Publication Data

US 2010/0158676 A1 Jun. 24, 2010

(30) Foreign Application Priority Data

Dec. 22, 2008 (GB) .................................. 0823240.7

(51) Int. Cl.
*F04D 29/08* (2006.01)
(52) U.S. Cl.
USPC ..................................... 415/174.4; 415/170.1

(58) Field of Classification Search
USPC .............. 415/170.1, 173.6, 174.4, 174.5, 230
See application file for complete search history.

(56) References Cited

U.S. PATENT DOCUMENTS 3,846,899 A * 11/1974 Gross ......................... 29/402.02

FOREIGN PATENT DOCUMENTS

JP 2003021481 A 1/2003

* cited by examiner

*Primary Examiner* — Dwayne J White

(57) ABSTRACT

A composite component such as a fan rear seal comprises a hub and a body of composite material which is molded over the outer periphery of the hub. The body is formed from a preform of fiber reinforcement impregnated with a resin, in a compression molding process. The body has an annular projection provided with a sealing surface. The sealing surface may comprise circumferential fins, or may be a surface of, for example, an abradable seal insert molded into the composite material of the body.

9 Claims, 3 Drawing Sheets

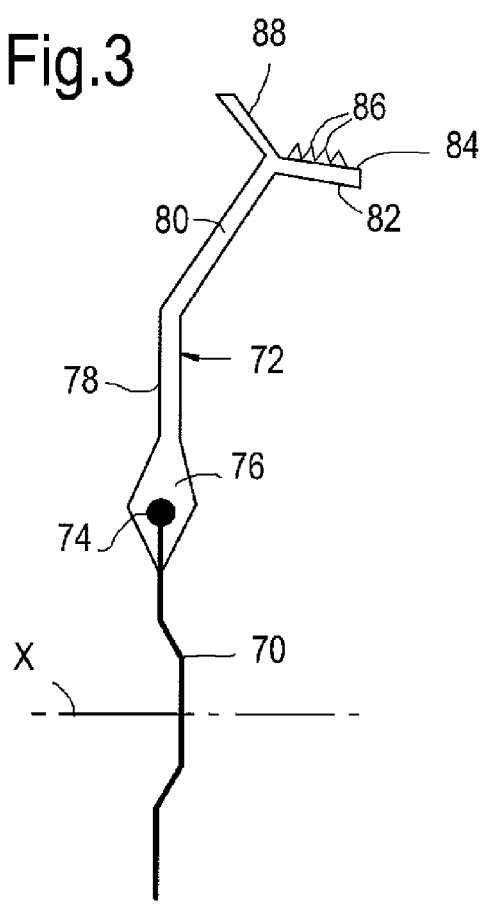
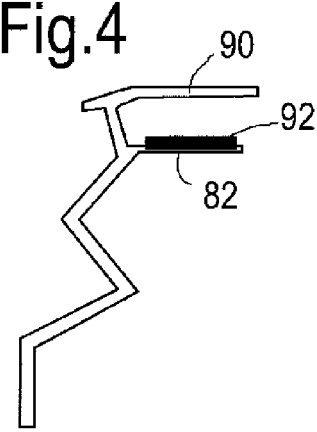
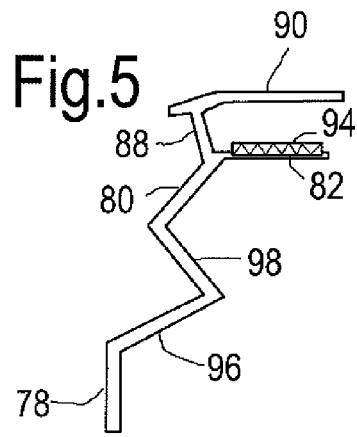
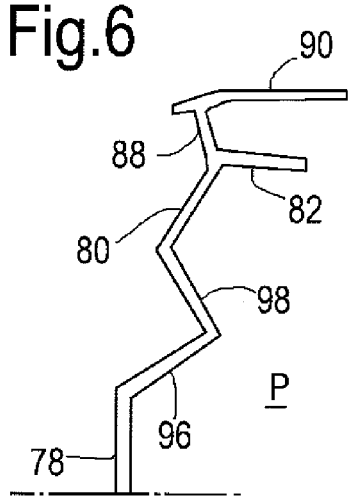
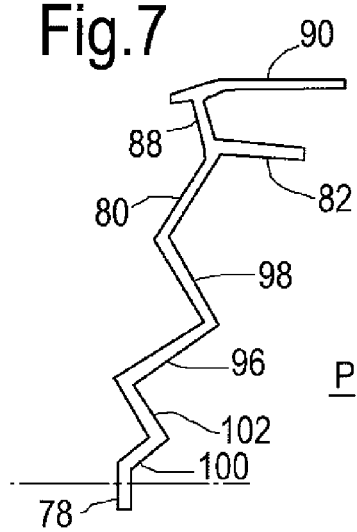

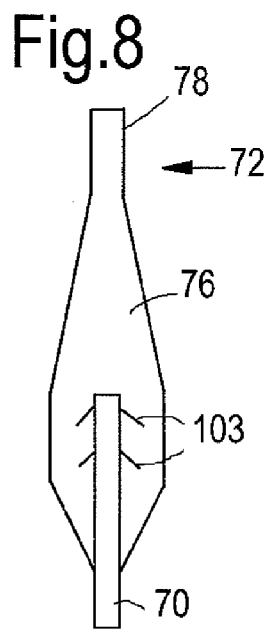
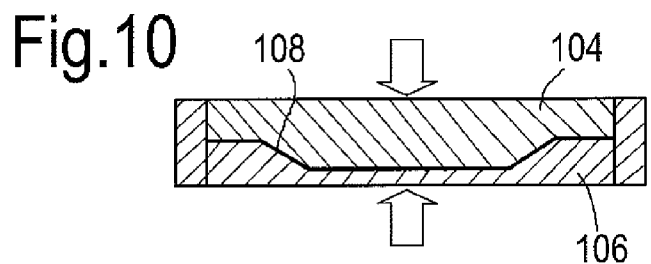
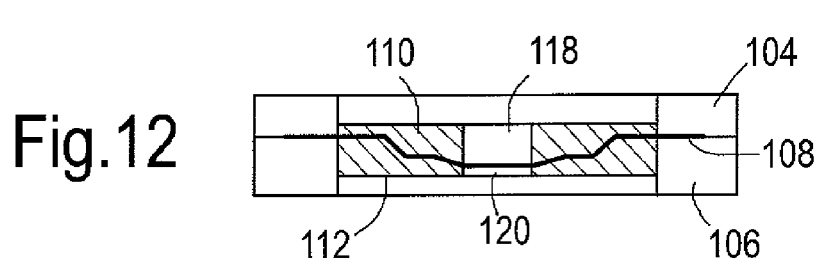
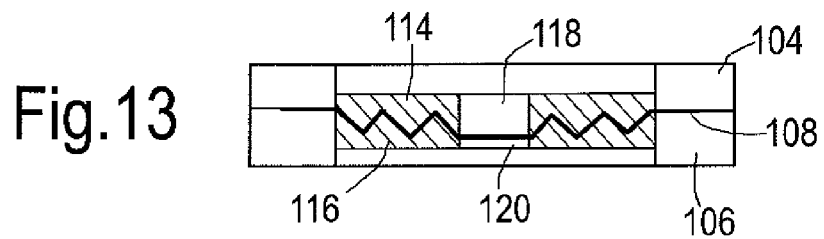

US 8,702,382 B2

COMPOSITE COMPONENT

CROSS REFERENCE TO RELATED APPLICATION

This application is entitled to the benefit of British Patent Application No. GB 0823240.7, filed on Dec. 22, 2008.

FIELD OF THE INVENTION

This invention relates to a composite component, and is particularly, although not exclusively, concerned with a fan rear seal for a gas turbine engine.

BACKGROUND OF THE INVENTION

A typical turbo fan gas turbine engine has a core engine which drives a fan at the front of the engine. The fan is part of a fan assembly comprising an array of fan blades mounted on a hub. The hub is a rotating component and is situated axially close to a stationary inner annulus defining the inner boundary of the gas flow path through the core engine. The interior of the inner annulus is typically under pressure, and it is necessary to provide a seal between the hub and the inner annulus to prevent leakage of pressurized air from the interior of the inner annulus.

To achieve this seal, the fan assembly includes a sealing component known as a fan rear seal which is secured to the hub and has an annular sealing surface which makes sealing contact with a complementary surface on, or fixed to, the inner annulus. Typically, fan rear seals are multi-piece machined forgings of aluminum or titanium alloy.

As well as providing a gas seal, fan rear seals also act as pistons, balancing load between the fan and the low pressure (LP) turbine that drives it. Fan rear seals are also required to support an axial force that gives a bearing end load, and also to protect the other components of the fan assembly from the high temperatures generated in the core engine, which could reduce the fatigue life of the fan components.

Fan rear seals made from alloy forgings are expensive and difficult to machine. The components are also heavy and are subjected to high stress and high vibration, which contributes to low fatigue lives. Damping mechanisms, such as damping rings, are often fitted to the fan rear seals in an attempt to reduce vibratory stresses, and this adds to the overall weight of the component. Aluminum alloys are relative inexpensive and easy to machine, but cannot withstand high temperatures and suffer from a low fatigue life and high thermal growth. Titanium alloys have superior physical properties, but are expensive and difficult to machine.

SUMMARY OF THE INVENTION

According to one aspect of the present invention, there is provided a composite component comprising a metallic hub defining a rotational axis of the component, and a body of a composite material which is compression moulded over a periphery of the hub.

The body may have an annular sealing surface for cooperation with a sealing ring. The annular sealing surface may be provided with circumferential fins. The annular sealing surface may be provided on a sealing element bonded to the body.

The sealing surface may be a surface of an abradable material, which may be the same as the composite material of the body. Alternatively, the abradable material may comprise a cellular material such as a metallic mesh which may be filled with a filler material.

The composite material of the body may comprise a fibre reinforcement in a resin matrix.

A peripheral region of the hub may be provided with a formation, such as an enlarged bead or a barbed formation, over which the composite material of the body extends, thereby to enhance locking engagement between the hub and the body.

The component may be a component of a gas turbine engine, such as a fan rear.

The present invention also provides a gas turbine engine having a stationary structure and a rotatable assembly which is rotatable with respect to the stationary structure, the rotatable assembly including a composite component as defined above, the body of the composite component having a sealing surface in sealing contact with a surface of the stationary structure.

According to another aspect of the present invention, there is provided a method of manufacturing a composite component, the method including the steps of defining a mould cavity between at least two dies;

disposing a metallic hub so that at least the periphery of the hub extends into the mould cavity;

disposing a composite preform in the mould cavity, the preform comprising a reinforcement material impregnated with a settable or curable resin; and performing a compression moulding process on the preform, thereby to cause the resin to set or cure to provide a body of composite material moulded over the periphery of the hub.

The mould cavity may have an annular surface for providing an annular sealing surface on the body of composite material. A sealing insert may be placed in the mould adjacent the annular surface of the mould, whereby the sealing insert is secured to the body of composite material during the compression moulding process. The sealing insert may be made from an abradable material, or may be provided with circumferential fins.

Alternatively, the annular surface of the mould cavity may be provided with formations for forming sealing formations such as fins on the body of composite material.

BRIEF DESCRIPTION OF THE DRAWINGS

FIG. 3 is a schematic cross-section of a fan rear seal comprising a metallic hub and a composite material body, in accordance with the present invention;

FIGS. 4 and 5 show alternative configurations for the component of FIG. 3;

FIGS. 6 and 7 show further alternative configurations for the component of FIG. 3;

FIG. 8 shows a variant of the interface between the metallic hub and the composite material body of the component of FIG. 3;

FIGS. 9, 10 and 11 illustrate a moulding process for forming a composite component; and FIGS. 12 and 13 illustrate the use of mould inserts in a moulding process in accordance with FIGS. 9 to 11.

DETAILED DESCRIPTION OF THE PREFERRED EMBODIMENTS

Figure 1:
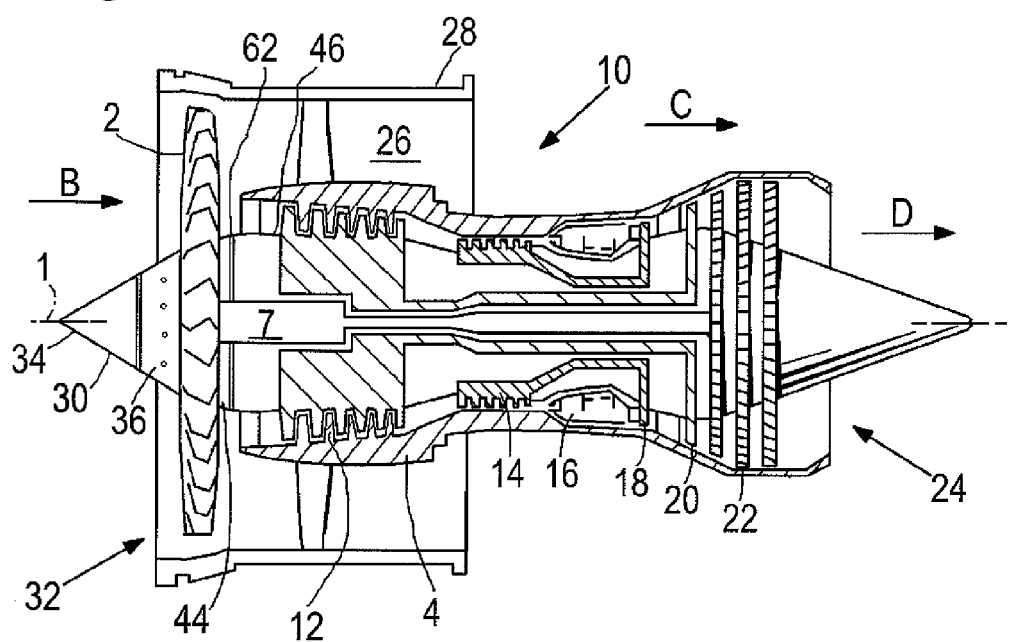
FIG. 1 is a schematic cross-sectional view of a turbo fan gas turbine engine.

Referring to FIG. 1, a turbofan gas turbine engine 10 comprises in flow series an inlet 32, a fan 2 and a core engine 4 comprising an intermediate pressure compressor 12, a high pressure compressor 14, a combustor 16, a high pressure turbine 18, an intermediate pressure turbine 20, a low pressure turbine 22 and an exhaust 24. The fan 2, compressors 12, 14, and turbines 18, 20, 22 are all arranged to rotate about a central common engine axis 1. Air is drawn into the engine 10, as shown by arrow B, through the annular inlet 32 and into the fan 2. The fan 2 compresses the air and a portion flows, in a downstream direction, into the core engine 4 where it is further compressed, mixed with fuel and burnt in the combustor 16.

Throughout this specification the terms 'downstream' and 'upstream' are used with respect to the general direction of gas flow through the engine 10.

The high pressure high energy gas stream exiting the combustor 16 then flows through the turbines 18, 20, 22, which extract energy from, and are rotated by, the gas stream so driving the compressors 12,14 and the fan 2 via shafts drivingly interconnecting them. The gas stream then exits the turbines through the exhaust 24 and provides a proportion of the propulsive thrust of the engine 10. A second portion of the air compressed by the fan 2 flows around the core engine 4 within a fan duct 26 defined by the outside of the core engine 4 and the engine casing 28. This flow of compressed air then exits the engine 10 as shown by arrow C providing a further proportion of the engine thrust. As such the gas turbine engine is of a conventional design and operation.

The fan 2 is part of a fan assembly including an array of fan blades 6 (one of which is shown partially in FIG. 2) which are mounted upon a central fan hub or disc 8. The blades 6 have inner shrouds 9 which, with a filler fairing 36 of a nose cone assembly 30, define an inner aerodynamic surface of the fan assembly. The fan hub 8 is attached to a fan shaft 7 which drivingly connects the fan 2 to the low pressure turbine 22. The nose cone assembly 30 is attached to the fan hub 6 and provides a smooth flow of air through the inlet 32, and into the fan 2.

At the downstream end of the hub 8, there is a fan rear seal 40 which is secured to the fan shaft 7 at its radially inner periphery 42. At its outer periphery, the fan rear seal 40 is provided with an annular fairing 44 which bridges a gap between the annulus formed by the shrouds 9 and an inner annulus 46 which defines the radially inner boundary of the annular gas flow passage which receives the core engine flow.

Figure 2:
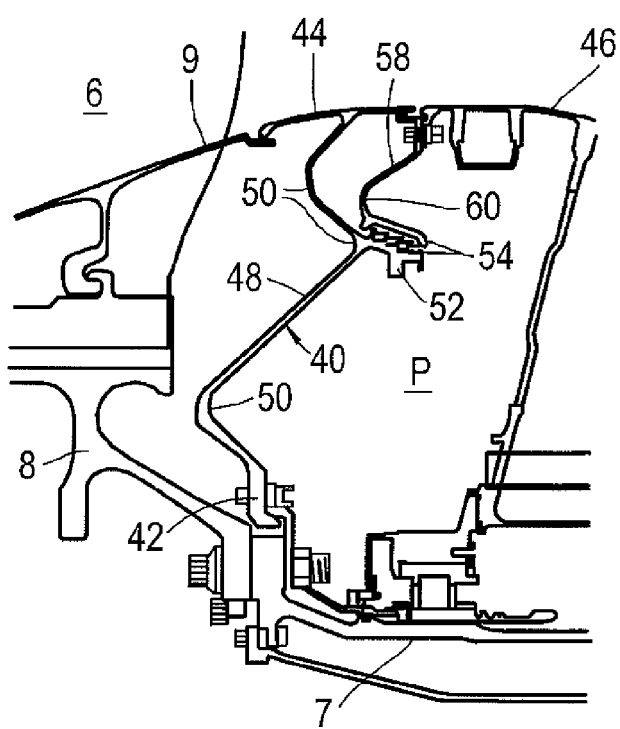
FIG. 2 represents a fan rear seal of a known engine having the general form shown in FIG. 1.

The fan rear seal 40 as shown in FIG. 2 has a body 48 in the form of a disc having a series of generally conical regions interconnected at bends 50. The disc 48 is provided, on the outside of the middle bend 50, with an annular projection 52 which provides a sealing surface from which machined fins 54 extend. The fins 54 cooperate with an abradable liner 56 carried by a stationary (i.e. non-rotating) ring 58 secured to the inner annulus 46. The ring 58 comprises two conical regions interconnected at a bend 60.

In operation, the fan rear seal 40 rotates at the speed of the fan 2. The fairing 44 thus rotates relatively to the inner annulus 46, while the labyrinth seal achieved by cooperation between the fins 54 and the abradable liner 56 seal the gap 62 (FIG. 1) between the hub 8 and the inner annulus 46 to support an elevated pressure in a zone P on the downstream side of the disc 48.

The temperature downstream of the disc 48 is elevated during steady-state running of the engine 10, and this raised temperature, along with centrifugal effects, causes the disc 48 to grow in the radial direction. The bends 50 enable this growth to occur, or be constrained, without creating excessive stress in the disc 48. Similarly, the bend 60 in the ring 58 enables the ring 58 to flex under the action of the radially expanding rim 52, in order to maintain a desired contact pressure between the fins 54 and the abradable liner 56.

FIG. 3 shows an alternative to the wholly metallic disc 48, in accordance with the present invention. The fan rear seal shown in FIG. 3 comprises a metallic hub 70 and a body 72 of a composite material which is moulded over the outer periphery of the hub 70. The hub 70 defines a rotary axis X which, when the component is mounted in a gas turbine engine such as the engine 10 of FIG. 1, will coincide with the engine axis 1. It will be appreciated that the hub 70 and the body 72 are generally axisymmetric about the axis X.

The metallic hub 70 may be made from a suitable alloy, such as an aluminum or titanium alloy, and is provided with a retaining feature 74 at its circular outer periphery. In the embodiment shown in FIG. 3, the retaining feature 74 is an enlarged bead which extends around the periphery.

The body 72 is moulded over the outer peripheral region of the hub 70, and in particular over the bead 74, as will be described below. The body 72 is a generally thin-walled moulding, nut, at its inner periphery, the body 72 has an enlarged region 76 which extends over the bead 74. From the enlarged region 76, the body 72 extends as a radial section 78, which adjoins a conical section 80. At the radially outer periphery of the conical section 80 there is an annular projection 82 having an annular sealing surface 84 provided with sealing fins 86. The body 72 also extends further outwardly as a conical section 88, which may terminate in a fairing 90 which is not shown in FIG. 3, but which is present in the embodiments of FIGS. 4 to 7.

In the embodiment of FIG. 3, the sealing fins 86 are moulded into the body 72 during the moulding process in which the body 72 is formed. Alternatively, as shown in FIG. 4, a separate sealing insert 92 may be moulded in situ into the body 72 during the process of moulding the body. The sealing insert 92 may have sealing fins 86 as shown in FIG. 3, or may have alternative sealing properties or formations.

FIG. 5 shows a variant of the embodiment shown in FIG. 4, in which, instead of the sealing insert 92, an insert 94 of abradable material is moulded in situ into the body 72. The abradable insert 94 may include a metallic mesh filled with a suitable filler material or with a metallic oxide paste. Thus, in known manner, the abradable insert can cooperate with sealing fins on the ring 58 (FIG. 2) to provide a seal between the inner annulus 46 and the body 72.

FIGS. 4 and 5 also show additional webs 96, 98 connecting the radial web 78 and the conical web 80 of FIG. 3, as also shown in FIG. 6. The mutually inclined webs 78, 96, 98, 80, 88, all of which are relatively thin-walled, give the body 72 a zigzag configuration as seen in cross-section. This configuration is adapted to suit the requirements of a particular engine in order to match thermal expansion and radial centrifugal growth of the hub 70 and body 72 to those of adjacent parts of the engine, and in particular the inner annulus 46 and the abradable liner 56 or other sealing component on the ring 58. The zigzag configuration also serves to limit axial movement, minimize vibration and provide flexibility to accommodate out of balance movement resulting from the loss of all or part of one or more of the fan blades 6.

The radial position of the axial projection 82 on which the sealing fins 86 or inserts 90, 92 are provided determines the area of the body 72 exposed to the pressure in the zone P. The body 72 acts as a piston acted upon by the pressure in the zone P and consequently the radial position of the projection 82 can be determined to achieve a desired axial load on the bearings of the shaft 7.

FIG. 7 shows a modification of the body 72 shown in FIG. 6, in which an additional pair of inclined webs 100, 102 are provided between the radial web 78 and the inclined web 96. Variation in the number and orientations of the various inclined webs can vary the net radial components of the pressure forces applied to the body 72. Thus, the relatively large web 102 compared to the web 100 increases the radially inwardly directed force component resulting from the elevated pressure in the zone P to the right of the body 72 as shown in FIGS. 6 and 7. Thus, the configuration of the body 72 can be controlled to provide desired pressure-dependent effects.

FIG. 8 shows an alternative to the bead 74 shown in the embodiment of FIG. 3. In the embodiment of FIG. 8, an array of barbs 103 is provided in the peripheral region of the metallic hub 70. The barbs 103 are embedded in the enlarged region 76 of the body 72, to anchor the hub 70 securely within the body 72. In particular, the barbs 103 are oriented to resist separation of the body 72 from the hub 70 in the radially outward direction. It will be appreciated that a variety of formations can be provided to enhance the connection between the hub 70 and the body 72 other than the bead 74 and the barbs 103. For example, holes may be provided in the hub 70, into which the material of the body penetrates during the moulding process.

FIGS. 9 to 11 represents a typical compression moulding process by which the body 72 can be formed and moulded over the periphery of the hub 70. The process is conducted using a closed mould comprising dies 104, 106 which are telescopically movable towards and away from each other to enable pressure to be applied to a preform 108 disposed within a mould cavity formed between the dies 104, 106. As a consequence of this process, the surfaces of the preform 108 take the precise form of the surfaces of the dies 104, 106 so that the finished component 72 is near net shape, i.e. its profile, surface finish and dimensions are close to, or within, the tolerances established for the component. As a result, subsequent finishing operations are unnecessary, or relatively minor.

The dies 104, 106 are made from a metallic material, such as aluminum or steel. The preform comprises a fibre reinforcement impregnated with a curable or settable resin, which may be a thermosetting or thermoplastic material. A suitable resin for manufacturing the body 72 is polyetheretherketone (PEEK), which is capable of withstanding the temperatures (of the order of 250° C.) encountered by the fan assembly 2 in normal operation of the engine 10. PEEK has a melting point of approximately 350° C. In the moulding process, the processing temperature is in the range 360 to 450° C., with the pressure required to consolidate the preform being approximately 20 MPa.

The fibre reinforcement may be made up of woven materials, with fibre orientations selected to meet the requirements of the finished product. The materials may have fibres oriented at ±45, 0/90, 30/60, or the fibre reinforcement may be built up from layers comprising uni-directional fibres. For example, the reinforcement material may be a woven carbon fibre reinforcement. Alternatively, glass, such as S-2 glass, aramid or silicon fibres. The nature of the layers, and the orientation of the fibre reinforcements may be selected to optimize the strength of the resulting component in specific desired directions. It may be desirable for the reinforcement to have hoop fibres in some areas, particularly when the component is a fan rear seal, to provide high resistance to creep growth. The number of layers can be varied over the extent of the preform 108, if changes in material thickness are required, for example at the enlarged region 76.

The preform sheets are cut, shaped and layered as required to produce the preform which is then placed in the lower die 106 with the hub 70. The dies 104, 106 may be preheated.

The upper die 104 is then lowered over the preform 108 and the hub 70 to close the mould, and pressure is applied as indicated by arrows in FIG. 10. The dies 104, 106 are maintained at the required pressure and temperature to consolidate the preform and to cure the resin. At the end of the curing process, the dies 104, 106 are separated, and the finished component 70, 72 is removed. In some circumstances, it may be desirable to allow the mould to cool with the component still in place within the mould, in order to minimize shrinkage. Alternatively, the component may be removed and allowed to cool outside the mould. For some materials, post curing is required at a higher temperature than the moulding temperature.

In the schematic diagrams of FIG. 11, the preform 108 is illustrated for simplicity as extending over the entire surfaces of the dies 104, 106. However, in manufacture of the fan rear seal of FIGS. 3 to 8, the metallic hub 70 will be located centrally within the mould, or integrated into the preform, before the moulding operation takes place. Consequently, the mould preform 108 in fact has a central opening within which the metallic hub 70 is disposed. Alternatively, two preforms may be used, one above and one below the hub 70.

Also, if inserts such as the inserts 92, 94 of FIGS. 4 and 5 are to be moulded into the body 72, the inserts 92 and 94 will be placed within the mould cavity formed between the dies 104 and 106 before the preform is introduced, so that the moulding process integrates the inserts 92, 94 with the moulded composite material of the body 72 to bond the insert 92, 94 to the moulded material with a strong joint. As mentioned above, the insert 94 may be made from an abradable material. A wide selection of suitable materials is available to meet the sealing requirements of the insert 92. Suitable materials for the insert are polytetrafluoroethylene (PTFE) or a graphite filled polyimide material, such as that available under the designation Torlon® 4275. Alternatively, the insert could be made from a material utilising the same resin matrix as that of the main body 72, but with a different reinforcement. For example, the insert 92 could comprise a short chopped fibre in a PEEK matrix. Carbon seals could be incorporated into the insert 92. In an alternative process, the moulded-in inserts 92, 94 may be replaced by separate seal components which are bonded to the finished body 72 after the moulding process is complete.

It will be appreciated that any surface features required on the body 72 can be formed by suitable profiling of the dies 104. For example, the dies 104, 106 may be provided with suitable formations for forming the fins 86 (FIG. 3). While FIGS. 9 and 10 show a mould made up of two dies 104, 106, it may in some circumstances be necessary for the mould to be made up of more than two dies. Also, the dies 104, 106 may be provided with replaceable mould inserts 110, 112 or 114, 116 as shown in FIGS. 12 and 13. In FIGS. 12 and 13, the upper and lower dies 104, 106 each have a respective projection 118, 120 which are permanent features of the mould and form a central region of the component. For example, the projections 118, 120 may be adapted to support the hub 70, and to form a cavity in which the enlarged region 76 of the body 72 may be moulded over the peripheral region of the hub 70.

With reference to FIG. 12, the mould inserts 110, 112 may be annular components which are secured, for example by screws, to the respective dies 104, 106 in order form a desired profile for the region of the body 72 between its inner periphery and its outer periphery. As can be appreciated from FIG.

13, the inserts 110, 112 can be replaced by further inserts 114, 116 to create a different profile for the body 72. The inserts 110, 112, 114, 116 need not be annular. Instead, different inserts could be used at different positions around the rotational axis X in order to achieve desired characteristics at different regions over the body 72.

Although the moulding process has been described with reference to the moulding of the body 72 over the periphery of the hub 70, it will be appreciated that inserts other than the hub 70 may be incorporated into the body 72. For example, features for securing other components of the fan rear seal or of the engine may be provided by additional inserts, of metal or other materials, placed within the mould cavity adjacent to or around the preform 108. The hub 70, or other metallic inserts, may be placed in the mould as finished inserts, or as part-machined components, with a material allowance to allow final machining to final tolerances after the moulding process is complete.

The use of a composite fan rear seal as described above would result in improved vibration performance over metallic fan rear seals as shown in FIG. 2 owing to the natural damping characteristics of the composite body 72. Also, low thermal growth compared with current metallic components means that a radially straighter, i.e. less convoluted, form of seal could be utilized. Thus, the configuration of the fan rear seal could be simplified, with savings of weight and cost.

Such a radially straighter seal would also suffer from lower radial growth under centrifugal loads, enabling the seal to be designed for greater effectiveness under all operating conditions, maintaining a minimum seal gap between the sealing face 84 and the cooperating sealing face 56 of the ring 58. This in turn leads to reduced leakage across the seal.

Although PEEK has desirable qualities which make it suitable for use in the manufacture of fan rear seals, other resin materials may be appropriate, particularly in different applications. For example, the resin matrix could be an epoxy, phenolic or bismaleimide (BMI) phenolic polyester thermosetting material. Alternatively, the resin matrix could be a thermoplastic material other than PEEK, for example polyetherketone (PEK) or polyethylenesulphide (PPS).

The invention claimed is:

1. A composite component comprising a metallic hub defining a rotational axis of the component, and a body of a composite material which is compression moulded over a periphery of the hub, further comprising an annular sealing surface, in which the annular sealing surface is a surface of an abradable material, in which the abradable material is the composite material of the body.

2. A composite component as claimed in claim 1, in which the annular sealing surface is provided with circumferential fins.

3. A composite component as claimed in claim 2, in which the circumferential fins are moulded from the composite material of the body.

4. A composite component comprising a metallic hub defining a rotational axis of the component, and a body of a composite material which is compression moulded over a periphery of the hub, further comprising an annular sealing surface, in which the annular sealing surface is provided on an insert which is bonded to the composite material of the body.

5. A composite component comprising a metallic hub defining a rotational axis of the component, and a body of a composite material which is compression moulded over a periphery of the hub, in which the composite material of the body comprises a fibre reinforcement in a resin matrix.

6. A composite component as claimed in claim 5, in which a peripheral region of the hub is provided with a formation over which the composite material of the body extends, thereby to enhance locking engagement between the hub and the body.

7. A composite component comprising a metallic hub defining a rotational axis of the component, and a body of a composite material which is compression moulded over a periphery of the hub, in which the component is a component of a gas turbine engine, in which the component is a fan rear seal for a gas turbine engine.

8. A composite component as claimed in claim 7, in which the annular sealing surface is provided with circumferential fins.

9. A composite component as claimed in claim 8, in which the circumferential fins are moulded from the composite material of the body.

* * * * *